(12) United States Patent
Rigg

(10) Patent No.: US 11,661,074 B1
(45) Date of Patent: May 30, 2023

(54) FOCUSED DRIVING SYSTEM AND METHOD OF USE

(71) Applicant: Connor L. Rigg, Fort Worth, TX (US)

(72) Inventor: Connor L. Rigg, Fort Worth, TX (US)

(*) Notice: Subject to any disclaimer, the term of this patent is extended or adjusted under 35 U.S.C. 154(b) by 519 days.

(21) Appl. No.: 16/905,180

(22) Filed: Jun. 18, 2020

(51) Int. Cl.
  *B60W 50/12* (2012.01)
  *B60R 16/023* (2006.01)
  *B60W 40/09* (2012.01)

(52) U.S. Cl.
  CPC ......... *B60W 50/12* (2013.01); *B60R 16/0231* (2013.01); *B60W 40/09* (2013.01); *B60W 2540/229* (2020.02)

(58) Field of Classification Search
  CPC ........... B60W 50/12; B60W 2540/229; B60W 40/09; B60R 16/0231
  See application file for complete search history.

(56) References Cited

U.S. PATENT DOCUMENTS

| | | | | |
|---|---|---|---|---|
| 9,688,143 B2* | 6/2017 | Bryk | ...................... | B60K 31/16 |
| 10,086,782 B1* | 10/2018 | Konrardy | ................ | G06F 30/20 |
| 10,142,458 B1* | 11/2018 | Cooksey | ........... | H04M 1/72463 |
| 2009/0302999 A1* | 12/2009 | Skertic | .................... | B60R 25/04 |
| | | | | 340/5.6 |
| 2013/0217990 A1* | 8/2013 | Saettel | .................. | B60K 28/06 |
| | | | | 600/365 |
| 2015/0099500 A1* | 4/2015 | Chalmers | .............. | H04W 4/027 |
| | | | | 455/418 |
| 2016/0050309 A1* | 2/2016 | Gooberman | ...... | H04M 1/72463 |
| | | | | 455/418 |
| 2017/0308817 A1* | 10/2017 | Miller | .................... | H04W 4/80 |

* cited by examiner

*Primary Examiner* — Behrang Badii
(74) *Attorney, Agent, or Firm* — Leavitt Eldredge Law Firm

(57) ABSTRACT

A focused driving system ties a driver's cell phone to the systems of the car that allow for its operation. A microcontroller monitors the cell phone for activity by the driver and disables the car if the cell phone is in use. The cell phone is linked to the microcontroller to facilitate the monitoring of the phone.

4 Claims, 4 Drawing Sheets

FOCUSED DRIVING SYSTEM AND METHOD OF USE

BACKGROUND

1. Field of the Invention

The present invention relates generally to vehicle systems, and more specifically, to a focused driving system that prevents the use of computing devices such as a mobile phone while a vehicle is in motion.

2. Description of Related Art

Vehicle systems are well known in the art and are effective means to move people and cargo from one place to another. While vehicle systems exist that sail over the water and fly through the air the present application focuses solely on those that drive on land. Commonly, vehicles such as cars, that drive on land operate on roads and highways. Each car is operated by a driver that follows the laws and procedures of the location in which the car is in use. For example, a person will drive their car from their residence to their work location along a set route. In this route, the person will encounter hundreds of other cars all moving in harmony with one another so that each person arrives at their destination safely.

One of the problems commonly associated with common vehicle systems is its limited efficiency. For example, control of the car must be maintained at all times or damage to the car or person could occur. Common types of distractions include the use of cellular phones by the driver or a passenger. These phones allow the driver to communicate through text and voice with others. Additionally, the phones allow for the display of video content, social media and games.

Accordingly, although great strides have been made in the area of vehicle systems in regard to the distraction of the driver, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
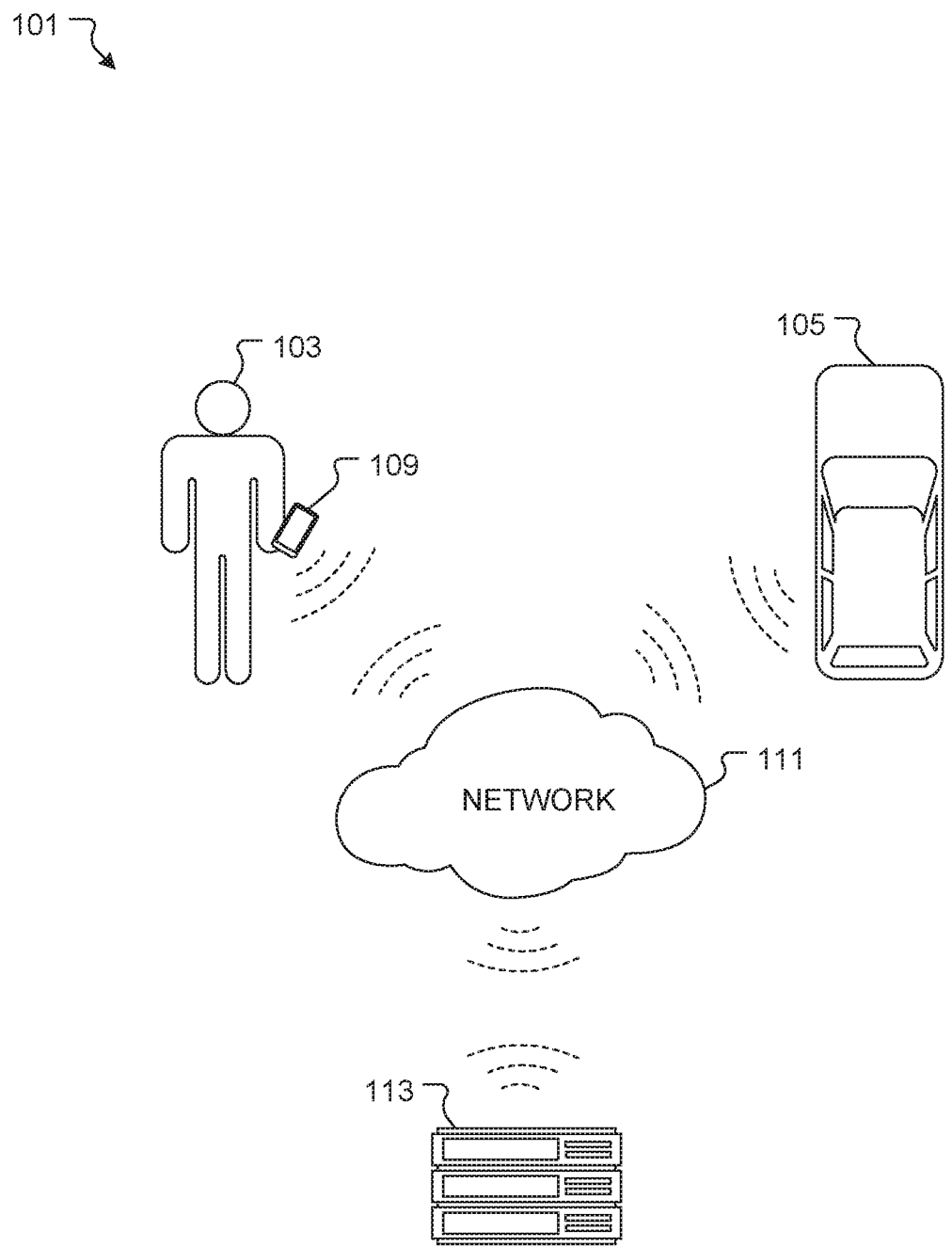
FIG. 1 is a diagram of a focused driving system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle systems. Specifically, the present invention provides the means of controlling the use of cellular phones while operating a vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a diagram of a focused driving system in accordance with a preferred embodiment of the present application. It will be appreciated that system 101 overcomes one or more of the above-listed problems commonly associated with conventional vehicle systems.

In the contemplated embodiment, system 101 includes a personal computing device 109 in communication with a vehicle 105 via a network 111. Further, an application server 113 is also in communication with the personal computing device 109 via the network 111. The personal computing device 109 and the vehicle 105 are operated by a user 103.

Figure 2:
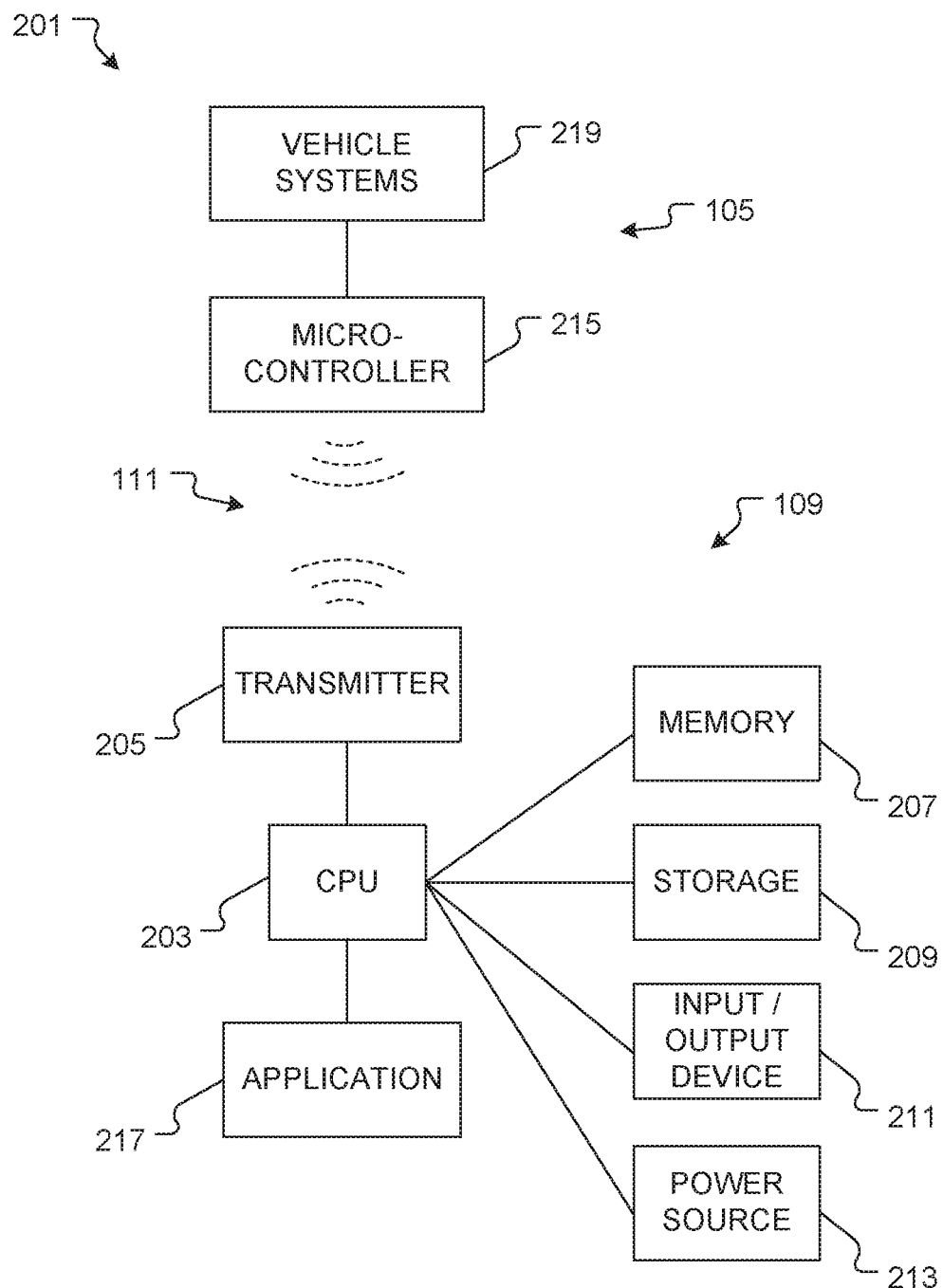
FIG. 2 is a diagram of the electronic environment created by the system of FIG. 1.

Referring to FIG. 2, an electronic environment 201 is created between the personal computing device 109, the vehicle 105 and the application server 113 via the network. Within this electronic environment 201 the system is able to function to prevent the distraction of the user 103 from the personal computing device 109 while the vehicle 105 is in operation. The electronic environment 201 is further created by a micro-controller 215 that communicates with the vehicle systems 219. The personal computing device 109 includes components that allow for its function and the communication through the network 111 such as a transmitter 205, a CPU 203, memory 207, storage 209, input/output devices 211 and a power source 213. The personal computing device 109 allows for the operation of applications 217 thereon as controlled by the CPU 203. These applications could reside in the storage 209 and memory 207 or come from the application server 113 via the network 211.

Figure 3:
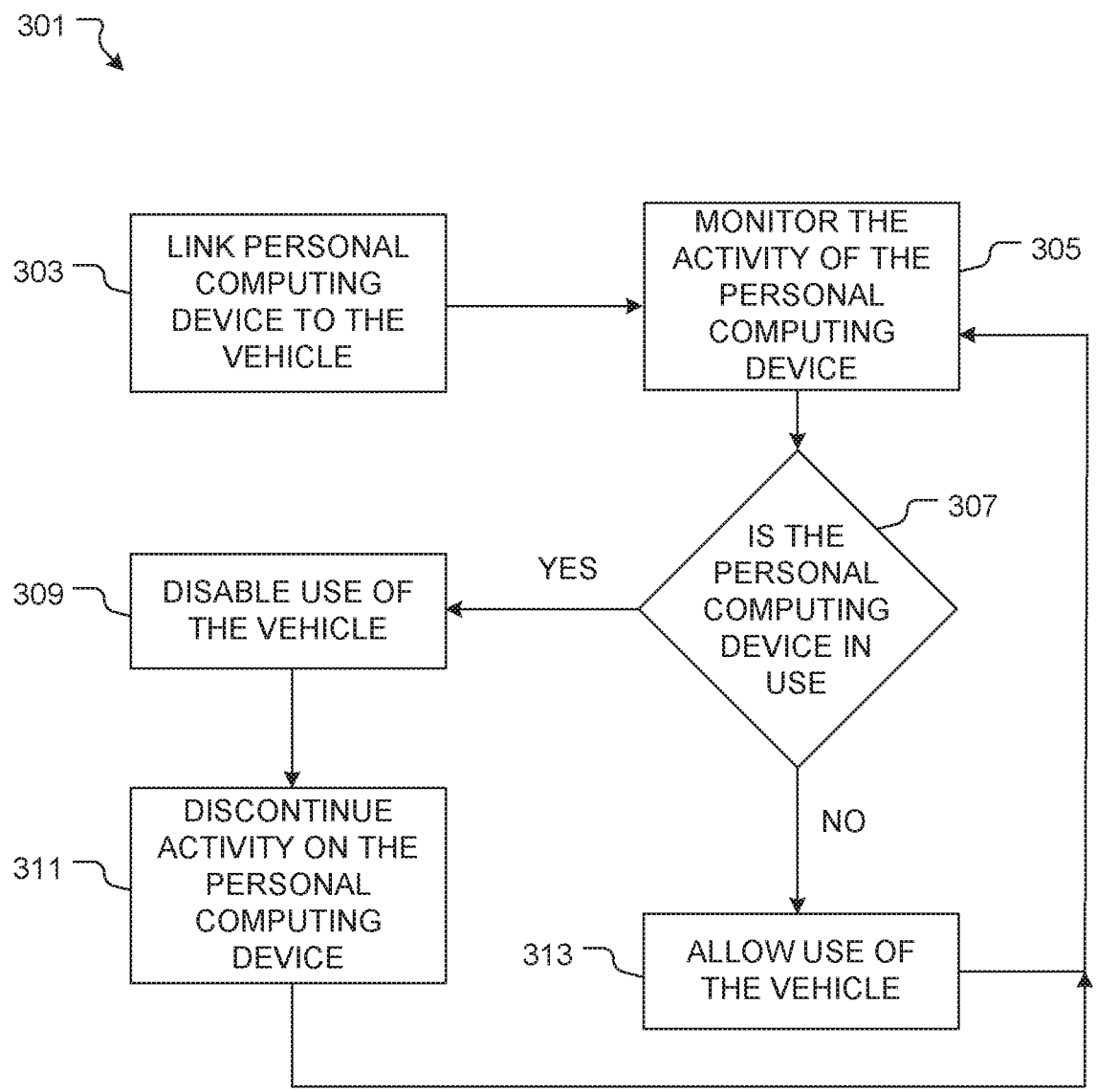
FIG. 3 is a flowchart of a method of controlling the use of a vehicle.

In use, as depicted by FIG. 3, the user linking their personal computing device to the microcontroller in the vehicle 303, the microcontroller monitors the activity of the personal computing device 305, if the personal computing device is in use 307, the microcontroller disables the use of the vehicle 309 until the user discontinues the activity on the personal computing device 311, if the personal computing device is not in use the microcontroller allows the use of the vehicle 313 and in both cases the microcontroller continues to monitor the use of the personal computing device 305.

It should be appreciated that one of the unique features believed characteristic of the present application is that the microcontroller 215 monitors the activity on the drivers personal computing device 109 such as a cellular phone and restricts the use of a vehicle 105 should the personal computing device 109 be active.

Figure 4:
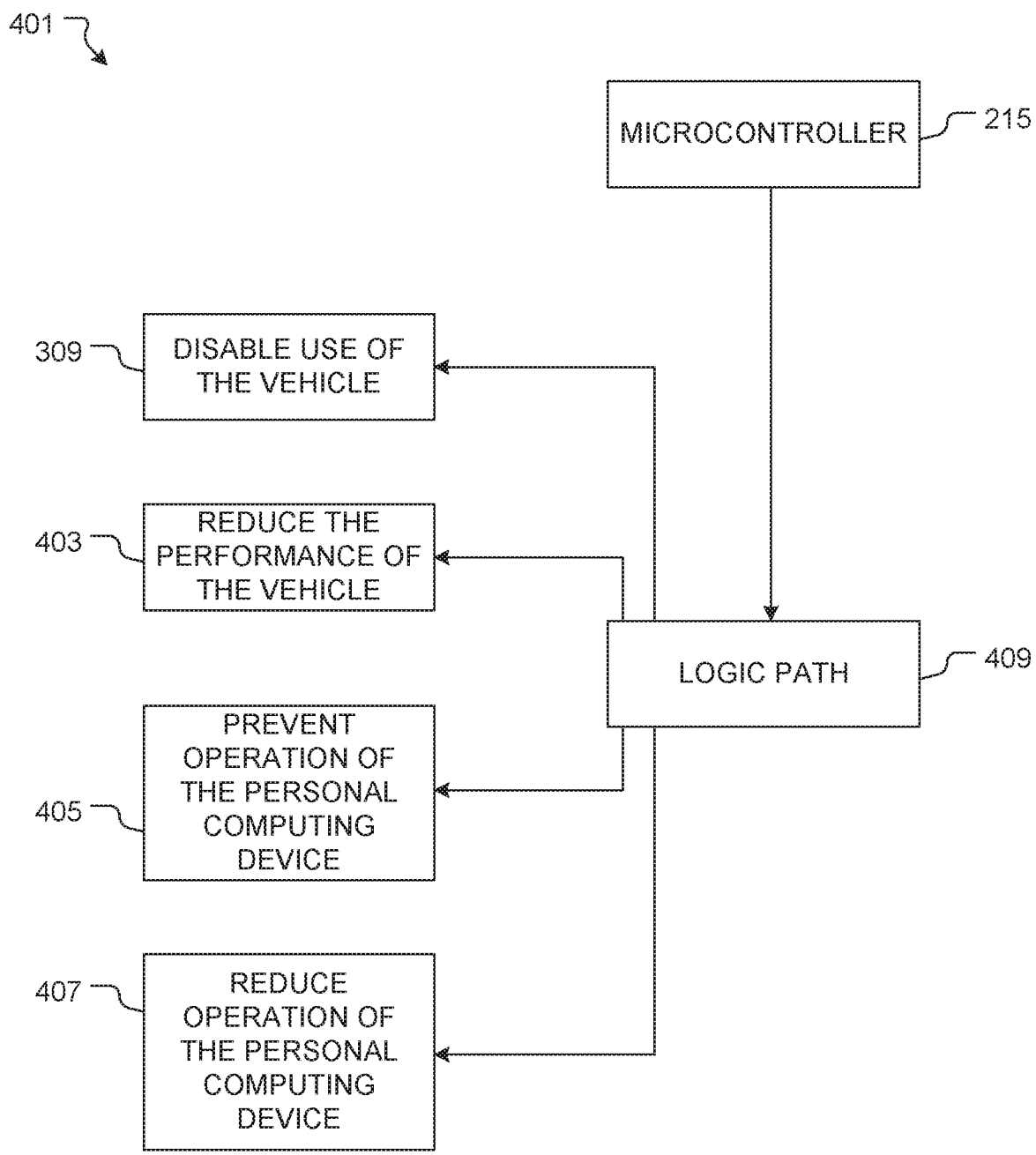
FIG. 4 is a diagram of the options of the microcontroller of FIG. 2.

It is contemplated and is depicted by FIG. 4 that the microcontroller 215 includes a logic path 409 that evaluates the status of the vehicle 105 and when the personal computing device is detected in use. While it has been described that the microcontroller 215 could prevent the use of the vehicle, it is also contemplated that other outcomes could be used by the microcontroller 215 when the logic path 409 determines the best action for example, it could reduce the performance of the vehicle 403 such as a limit on the speed of the vehicle , it could prevent operation of the personal computing device 405 or it could reduce operation of the personal computing device 407 such as a limit to only GPS or maps thereon. While these outcomes have been depicted and described it is contemplated that others could be used.

It is contemplated that the microcontroller is any mechanism or device that communicates both with the personal computing device and a vehicle. It is contemplated that the microcontroller could be a standalone device that is added to the vehicle after its manufacture or that it could be integrated in the vehicle. It is further contemplated that the microcontroller could be integrated into personal computing device and that a signal is sent therefrom to communicate with the vehicle.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A focused driving system comprising:
   a personal computing device in communication with a microcontroller;
   the microcontroller is attached to and in communication with the systems of a vehicle;
   wherein the microcontroller monitors the activity of the personal computing device; and
   wherein the microcontroller disables the use of the vehicle's systems when activity is detected on the personal computing device.

2. The system of claim 1 wherein the personal computing device is a cellular phone.

3. The system of claim 1 wherein a logic path is used to determine the action to be taken by the microcontroller.

4. A method of controlling the use of a vehicle, comprising:
   the user links their personal computing device to the microcontroller in the vehicle;
   the microcontroller monitoring the activity of the personal computing device;
   if the personal computing device is in use the microcontroller disabling the use of the vehicle;
   the user discontinuing the activity on the personal computing device;
   if the personal computing device is not in use the microcontroller allowing the use of the vehicle; and
   in both cases, the microcontroller continues to monitor the use of the personal computing device.

* * * * *